United States Patent [19]

Authelet et al.

[11] Patent Number: 4,627,984

[45] Date of Patent: Dec. 9, 1986

[54] PROCESS FOR MANUFACTURING AND PACKAGING SOFT CHEESE

[75] Inventors: Marc Authelet, Laneuveville Dt Nancy; Jean Perrin, Tomblaine, both of France

[73] Assignee: Saint-Hubert Industrie Laitiere, Ludres, France

[21] Appl. No.: 684,050

[22] Filed: Dec. 20, 1984

[30] Foreign Application Priority Data

Dec. 23, 1983 [FR] France ................. 83 20699

[51] Int. Cl.$^4$ ........................... A23C 19/097
[52] U.S. Cl. .......................... 426/37; 426/8; 426/124; 426/130; 426/398; 426/407; 426/411; 426/412; 426/415; 426/582; 206/204
[58] Field of Search .............. 426/127, 130, 412, 126, 426/112, 414, 411, 413, 415, 582, 8, 36, 37, 38, 39, 398, 124, 407; 206/204

[56] References Cited

U.S. PATENT DOCUMENTS

| | | | |
|---|---|---|---|
| 2,155,736 | 4/1939 | Parsons | 426/130 |
| 2,402,605 | 6/1946 | Cowen | 426/130 |
| 2,441,477 | 5/1948 | Farrell | 426/127 |
| 2,470,465 | 5/1949 | Broeren et al. | 426/127 |
| 2,497,203 | 2/1950 | Bennett | 426/127 |
| 2,697,664 | 12/1954 | Goeser et al. | 426/415 |
| 2,999,758 | 9/1961 | Brown | 426/127 |
| 3,015,596 | 1/1962 | Couch et al. | 426/127 |
| 3,049,429 | 8/1962 | Couch et al. | 426/127 |
| 3,111,412 | 11/1963 | Mouk | 426/411 |
| 3,531,300 | 9/1970 | Greenberg et al. | 426/412 |
| 3,769,028 | 10/1973 | Katz et al. | 426/412 |
| 3,798,340 | 3/1974 | Reinbold et al. | 426/130 |
| 3,863,832 | 2/1975 | Gordon et al. | 229/48 T |
| 3,920,850 | 11/1975 | Hain et al. | 426/412 |
| 3,986,832 | 10/1976 | Smorenburg | 426/412 |
| 4,276,340 | 6/1981 | Leiris | 426/130 |

FOREIGN PATENT DOCUMENTS 644532 10/1928 France.
2211927 7/1974 France.

OTHER PUBLICATIONS

Cheese and Fermented Milk Foods, Kosikowski, 1966, various pages.
Cheese, Davis, vol. 1, American Elsevier Publ. Co., 1965.

Primary Examiner—Steven Weinstein
Attorney, Agent, or Firm—Murray and Whisenhunt

[57] ABSTRACT

In a process for manufacturing and packaging soft cheese with a bloomed or washed rind, the cheese is packaged in a wrapper comprising a moisture-absorbing inside layer on the side in contact with the cheese and a moisture-proof outside layer. The cheese is then placed in a hermetically sealed box which is then pasteurized.

12 Claims, No Drawings

PROCESS FOR MANUFACTURING AND PACKAGING SOFT CHEESE

BACKGROUND OF THE INVENTION

1. Field of the Invention

The object of the invention consists in a process for manufacturing and packaging soft cheese with a bloomed or washed rind which increases its shelf life prior to consumption. In the present context this reference to shelf life should be understood as referring more precisely to the "life cycle" of the cheese during which any changes in it are such that it retains its usual appearance (with a normal-looking bloom in the case of a cheese with a bloomed rind), its flexibility and above all its quality with regard to taste, so that it may be consumed with all the satisfaction which might be expected.

2. Description of the Prior Art

When a cheese of this kind, such as brie or camembert, is manufactured by the normal cheesemaking methods and packaged in the habitual manner, its shelf life is relatively short. For example, the normal shelf life of a cheese manufactured and packaged in the conventional manner (in aluminium foil in a wooden or cardboard box, etc) is approximately 45 days at a temperature of 4° to 6° C. For cheeses to be exported over long distances, they must be stored for three to four months without deterioration in their appearance, texture or organoleptic qualities.

Consideration has been given to overcoming these difficulties by packaging the cheese in sealed boxes, either of metal or of plastics materials, and subjecting them, after packaging, to sterilization at a temperature of 100° to 200° C. in order to prevent these problems arising for several months. The results achieved in this way have not been satisfactory. The rind of the cheese is washed, so that it loses its bloom and its color changes, tending to redden, as a result of which the cheese loses its attraction for the consumer, from the point of view of its appearance alone, not to mention its quality which is also degraded.

A principal objective of the invention is to provide a process for manufacturing and packaging cheeses of the kind in question which considerably extends the shelf life of the cheese, in the sense explained hereinabove, whilst retaining all its qualities.

Another object of the invention is to provide economic packaging means for such cheeses within the context of this process.

The manufacture of cheese comprises a sequence of operations which are well known and will not be described here in full.

Following the addition of rennet, traditionally effected at 32° to 34° C. and bringing about flocculation of the casein, the curds separate out from the whey and are then cut up and placed in a mold; the curds are drained in the mold and assume their final form; following this molding there are effected the operations of acidification, salting and seeding with the penicillium which produces the surface bloom in an initial period of 9 to 11 days, after which the cheese is subject to a maturing stage during which it is turned over several times at regular intervals, for a period which is usually at least three weeks and at a temperature of 7° to 10° C.

SUMMARY OF THE INVENTION

In one aspect, the invention consists in a process for manufacturing and packaging soft cheese with a bloomed or washed rind in which the cheese is packaged in a wrapper comprising a moisture-absorbing inside layer on the side in contact with the cheese and a moisture-proof outside layer and then placed in a hermetically sealed box which is then pasteurized.

Thus when the cheese has achieved its final state, it is packaged in a wrapper comprising two layers, a moisture-absorbing inside layer which is applied directly to the cheese without any preparatory operation and a moisture-proof outside layer wrapped around the inside layer. The thus packaged cheese is placed in a box which is hermetically sealed, without any additives or any preparatory operation being necessary; the box is then subjected to pasteurization, this operation being known per se, at a sufficiently high temperature, preferably 100° C. for a period of 50 minutes. In practice, the box containing the cheese is immersed in heated water pressurized to 0.5 bars above atmospheric pressure. This pressure opposes swelling of the box when heated, so that after cooling the box retains its initial appearance.

The wrapper may comprise two separate films in which the cheese is successively wrapped. It may instead comprise a single composite film obtained by bonding together by any appropriate means (high-temperature adhesive, heat-welding, etc) two films with the respective properties indicated hereinabove.

In another aspect, the invention consists in a wrapper suitable for use in a process as hereinabove defined, comprising a first film of non-woven cellulose fibers bonded to a second film of aluminum foil by means of an adhesive adapted to withstand temperatures of at least 130° C., the composite wrapper having a weight per unit area of approximately 35 g/m$^2$.

Various materials may be employed within the context of the invention, but it is highly preferable to use for the moisture-proof outside layer a thin film of aluminum foil and for the moisture-absorbing inside layer a non-woven film of cellulose fibers. These two films may advantageously be bonded together by means of an adhesive adapted to withstand temperatures of at least 130° C., preferably an adhesive based on casein, to constitute a composite film having a weight per unit area of 35 g/m$^2$, for example. In this way the cheese is wrapped in both films in a single operation.

Similar considerations apply to selecting the material of the box. A metal box or can with a lid crimped on after placing in it the cheese wrapped as just described may be suitable if is is perfectly degreased beforehand. However, as is well known, the manufacture of metal cans is inevitably accompanied by deliberate or involuntary contamination of their surface with grease; since perfect degreasing is difficult and never dependably obtained, it is routine practise to cover the inside surface of metal cans for food products with a layer of varnish. However, this entails the risk of contaminating the cheese with foreign odors during the pasteurization operation and during its subsequent shelf life.

Consequently, if no perfectly degreased metal or strictly inert varnish is available, it is preferable to use a box of plastics material adapted to withstand temperatures of 130° C., for example an injection molded polypropylene box.

In a further aspect, the invention consists in a box suitable for use in a process as defined hereinabove, fabricated from cardboard coated on both sides with polypropylene and comprising, for the purpose of achieving a hermetic seal, a lid consisting of a thin sheet of aluminum or cardboard coated on one side at least with a layer of polypropylene whereby it may be heat-sealed to an upper edge of the remainder of the box.

A preferred embodiment of the box in accordance with the invention comprises a cardboard sheet totally enclosed between two injection molded layers of transparent polypropylene. The cardboard may be printed before the polypropylene is molded over it and carry on its outside surface any required markings.

A box of this kind offers the further advantage of providing for simple implementation of a hermetic seal. Use is made of a complex lid comprising a film of aluminum or cardboard covered on one side at least with a layer of polypropylene. The lid is heat-sealed at 230° C. to the free upper edge of the remainder of the box, where polymer meets polymer, in approximately 1.5 seconds.

It has been found that a cheese wrapped, packaged and pasteurized (at 100° C. for 50 minutes, for example) as just described is not subject to any deterioration for at least six months. More precisely, if any changes occur during this time, they are sufficiently slow for, at the end of six months, the cheese to retain its initial fresh appearance with a virtually unchanged bloom, with only a few reddish traces in the worst case, and with the same flexibility of texture and the same quality from the taste point of view.

Without it being possible to provide a total explanation of the phenomenon, it is believed that the moisture-absorbing inside layer, which is non-woven, for example, absorbs water vapor released from the cheese, during the pasteurization operation in particular. The moisture-proof outside layer prevents this water vapor escaping so that, on cooling after pasteurization, the cheese is maintained in an atmosphere which prevents it drying out but which does not result in localized accumulation of water since the latter is contained and distributed throughout the thickness of the moisture-absorbing inside layer.

Comprehensive and extensive tests have shown that water exits the cheese in a somewhat sudden manner at 100° C.; the moisture-absorbing layer absorbs it as it is produced, which eliminates the risk of washing of the rind and disappearance of the bloom. Then, during cooling, the moisture-absorbing layer slowly returns the water to the cheese, by capillary action, which again avoids washing of the rind and also drying out of the cheese.

It has also been established that it is highly desirable to modify the traditional process for manufacturing soft cheese with a bloomed rind in a way which favors and renders more effective the process as defined hereinabove. The process is effective, as has already been explained, but the modifications to be explained below place the cheese in a state in which it is better prepared to withstand the process and to more fully retain all its qualities after application of the process. Moreover, these modifications have the further advantage that they significantly reduce the natural maturing period. With these modifications, the pasteurization operation carried out under the conditions explained hereinabove becomes to some extent a part of the traditional maturing process.

The modifications made to the traditional process, in the context of the present invention, are as follows:

the rennet is added at a temperature of 38° to 39° C. instead of 32° to 34° C., after cutting the curds, slightly salted (1 to 1.2% by weight of NaCl) water is added to them in order to increase the pH of the curds prior to molding; this application of slightly salted water takes place at a temperature of approximately 61° C., and the quantity added is approximately 10% of the volume of milk converted into cheese; the effect is to increase the acidity of the lactoserum which accompanies the curds prior to draining from the traditional value of 12.5 to 13°. Dornic to a value of 7° to 11° Dornic and preferably a value of 8° to 10° Dornic, after addition of the water.

The effect of these modifications is, on the one hand, to initiate solubilization of the curds and, on the other hand, to procure an osmotic action which enhances the elimination of lactose from the curds. The higher temperature at which the rennet is added results in a selection of germs; the addition of slightly salted hot water results in supplementary sweating of the curds, which speeds up draining, and an increase of approximately 10% to 15% in the rate of lactose elimination, as compared with the traditional process.

The initiation of solubilization of the curds which occurs at this time subsequently (during pasteurization effected as explained hereinabove) results in virtually complete solubilization of the curds, the effect of which is comparable to that of traditional maturing.

Consequently, it has been found that, on the one hand, the process in accordance with the invention enables a cheese produced according to the traditional process to be stored for up to six months without deterioration and, on the other hand, that the process can be integrated into the manufacturing process, at least partially replacing the traditional maturing operation, provided that the state of the curds is slightly modified as compared with the traditional state prior to placing in the mold.

Thus it becomes possible, after seeding the surface of the molded and drained curds with penicillium candidum, and after a period of 9 to 11 days for the bloom to develop, to treat the cheese directly by means of the process described hereinabove. The elimination of the conventional maturing stage means that the manufacturing period may be reduced by three weeks.

By proceeding in this way, with the modifications as described hereinabove, pasteurization produces a cheese with the following verified characteristics: a homogeneous and well-integrated texture, with optimum organoleptic qualities and an increased shelf life without deterioration.

The modifications as described hereinabove are not essential, but it is preferable to employ them in the context of the invention since they make it possible to obtain the full benefits of the process from the point of view of shortening the manufacturing period and guaranteeing a longer shelf life under improved conditions.

It will be understood that various changes may be made to the details of the process by those skilled in the art within the principle and scope of the invention as expressed in the appended claims.

We claim:

1. A process for extending the shelf life of soft cheese with a bloomed or washed rind to a period of at least three months comprising:

a. wrapping said cheese in a wrapper having a moisture-absorbing inside layer on the side of the wrapper in contact with the cheese, and a moisture-proof outside layer;

b. placing the so wrapped cheese into a hermetically sealable box with at least the inside surface thereof being coated with a heat sealable, moisture-impervious coating, said box having an upper edge for receiving a moisture-impermeable lid;

c. sealing a moisture-impermeable lid onto said upper edge so as to effect a hermetical seal; and d. pasteurizing the so wrapped and boxed cheese at a temperature between 100° C. and 130° C.

2. The process according to claim 1 wherein the said moisture-absorbing inside layer and the moisture-proof outside layer are bonded together by means of adhesive.

3. The process according to claim 2 wherein the adhesive is a casein adhesive with a service temperature of at least 130° C. and is constituted by a film having a weight of about 35 g/m$^2$.

4. The process according to claim 1 wherein the wrapped and boxed cheese is immersed in heated water pressurized to 0.5 bar above atmospheric pressure during the pasteurizing step.

5. The process according to claim 1 where the said soft cheese is made by a process which includes the steps of:

a. adding rennet to milk at a temperature of 38°-39° C. to form curds;

b. adding salted water, having 1 to 1.2% by weight of NaCl, to the curds and then molding the curds in order to increase the acidity of the curds to a value of 7° to 11° Dornic, whereby the elimination of lactose from the curds is increased;

c. draining the molded curds and seeding the surface of the drained curds with Penicillum candidum; and d. allowing the seeded curds to develop a bloom within 9 to 11 days.

6. The process according to claim 5 wherein the salted water is added at a temperature of approximately 61° C. to an amount of approximately 10% of the volume of the milk treated.

7. The process according to claim 1 wherein the said shelve life is at least 6 months.

8. The process according to claim 1 wherein the inside layer of the wrapper is a film of non-woven cellulose fibers.

9. The process according to claim 1 wherein the outside layer of the wrapper is aluminum foil.

10. The process according to claim 1 wherein the said box is a cardboard box and said coating is disposed on both the inside surface and the outside surface of the box.

11. The process according to claim 10 wherein the said coating is a polypropylene coating.

12. The process according to claim 11 wherein the said lid is sealed to said upper edge at a temperature of about 230° C.

* * * * *